(12) United States Patent
Huang

(10) Patent No.: US 6,359,653 B1
(45) Date of Patent: Mar. 19, 2002

(54) METHOD AND APPARATUS FOR VGA TO TV DATA TRANSFORMATION USING BACKGROUND-BASED ADAPTIVE FLICKER REDUCTION

(75) Inventor: Chien-Hsiu Huang, Tainan Hsien (TW)

(73) Assignee: Silicon Integrated Systems Corp., Hsinchu (TW)

(*) Notice: Subject to any disclaimer, the term of this patent is extended or adjusted under 35 U.S.C. 154(b) by 0 days.

(21) Appl. No.: 09/338,040

(22) Filed: Jun. 22, 1999

(51) Int. Cl.$^7$ ................................................ H04N 7/01
(52) U.S. Cl. ........................ 348/447; 348/446; 348/910
(58) Field of Search ................................. 348/446, 910, 348/625, 565, 570, 447, 627, 613

(56) References Cited

U.S. PATENT DOCUMENTS 5,894,330 A   4/1999  Huang et al.
6,094,226 A * 7/2000  Ke et al. .................... 348/446
6,172,718 B1 * 1/2001 Alvarez et al. ............. 348/625

* cited by examiner

Primary Examiner—Victor R. Kostak

(57) ABSTRACT

A VGA to TV data transformation system uses a background-based adaptive flicker reduction method. Information in a picture displayed on a screen of a monitor is divided as graphic and video information. Graphic information which includes cursor, graphic data, and sub-picture of video data in video information is prone to flicker. A background-based adaptive flicker reduction is applied to pixels in regions containing graphic information. A current pixel and the adjacent pixels directly above and below the current pixel are used to compute Mean and Diff values. The background state of a current pixel is determined by comparing the Mean value with a threshold value. The background state, the Mean value and the Diff value are then used to select a flicker reduction mode that may be strong reduction, median reduction, mild reduction or no reduction. An anti-flicker pixel is generated according to the flicker reduction mode.

12 Claims, 3 Drawing Sheets

METHOD AND APPARATUS FOR VGA TO TV DATA TRANSFORMATION USING BACKGROUND-BASED ADAPTIVE FLICKER REDUCTION

FIELD OF THE INVENTION

The present invention generally relates to the transformation of graphic and video data from VGA to TV interface, and more particularly, to a background-based adaptive method and apparatus for reducing flicker in a picture due to the transformation and improving the quality of the picture.

BACKGROUND OF THE INVENTION

The transformation of data from a VGA format to a TV format has been necessary in many applications in recent years. The data in a VGA system usually has a progressive scan format. In a TV system, however, the data is normally interlaced. Because of the different data format, flicker phenomenon appears inevitably when VGA data is transformed to TV data if the adjacent scanning lines have large difference. It is very important to reduce the flicker caused by the transformation. Conventional approaches to reducing the flicker often sacrifice the vertical resolution and sharpness of edges in a picture.

Traditionally, the picture of VGA data for computers includes only graphic information. Due to the popularity of DVD (digital video disk), the picture of VGA data comprises both graphic and video information. Generally speaking, graphic data have more high frequency components from a spectral point of view. The change of luminance level is also larger. Therefore, the flicker problem is more pronounced. On the other hand, video data have more low frequency components and the change of luminance level is smaller. It is not so critical whether the flicker problem is addressed or not.

Conventional approaches to flicker reduction do not take into account the content or correlation in the data of a picture. In order to reduce the flicker problem, the whole picture is processed by a flicker reduction algorithm that may also result in picture blurring.

To overcome the drawbacks and improve the quality of a picture, some adaptive techniques, for example, U.S. Pat. No. 5,894,330, have been adopted. Nevertheless, there is a very important issue that is often ignored, i.e., the impact of the background of a picture to a human eye. Because of the ocular property, human eyes are very sensitive to the background of the high luminance level that makes the flicker effect more conspicuous. It is highly desirable to have a flicker reduction technique that can be adaptive to the background and does not sacrifice the quality of a picture.

SUMMARY OF THE INVENTION

To overcome the aforementioned drawbacks, the primary object of the present invention is to provide a method for reducing the flicker phenomenon in VGA to TV data transformation by using a background-based adaptive flicker reduction technique. According to this invention, the component of a picture are categorized as cursor, graphic, video data and sub-picture. Except for video data, other components are usually treated as graphic data. In order to improve the resolution of a picture, flicker reduction is only applied to graphic data because video data do not have severe flicker phenomenon in the data transformation.

Another object of the invention is to provide a background-based flicker reduction algorithm that adapts to the background automatically. When the background-based adaptive flicker reduction is enabled, whether the background is bright or dark is determined by computing the mean value around a current pixel. A difference value defined according to the absolute differences between the current pixel and its upper pixel and lower pixel is also computed. The mean and difference values are used to determine how the background-based adaptive flicker reduction method is applied. Four different degrees of flicker reduction which are strong, median, mild and no reduction may be applied.

If the background is bright and the contrast is large around the current pixel, strong flicker reduction is adopted because the flicker phenomenon is very sensitive to the human eye under this circumstance. However, if the background is dark and the contrast is small around the current pixel, flicker reduction is not applied in order to improve the resolution of picture.

A further object of the invention is to provide an easily realizable apparatus for the background-based flicker reduction. According to this invention, the background-based adaptive flicker reduction method can be implemented using simple hardware. Only shifters and simple circuits are required to realize the flicker reduction method. Therefore, the cost of the apparatus for the background-based adaptive flicker reduction of the present invention is relatively low.

These and other objects and advantages of the present invention will become more apparent from a consideration of the following detailed description of preferred embodiments thereof, when read in conjunction with the accompanying drawings.

DETAILED DESCRIPTION OF THE PREFERRED EMBODIMENTS

Figure 1:
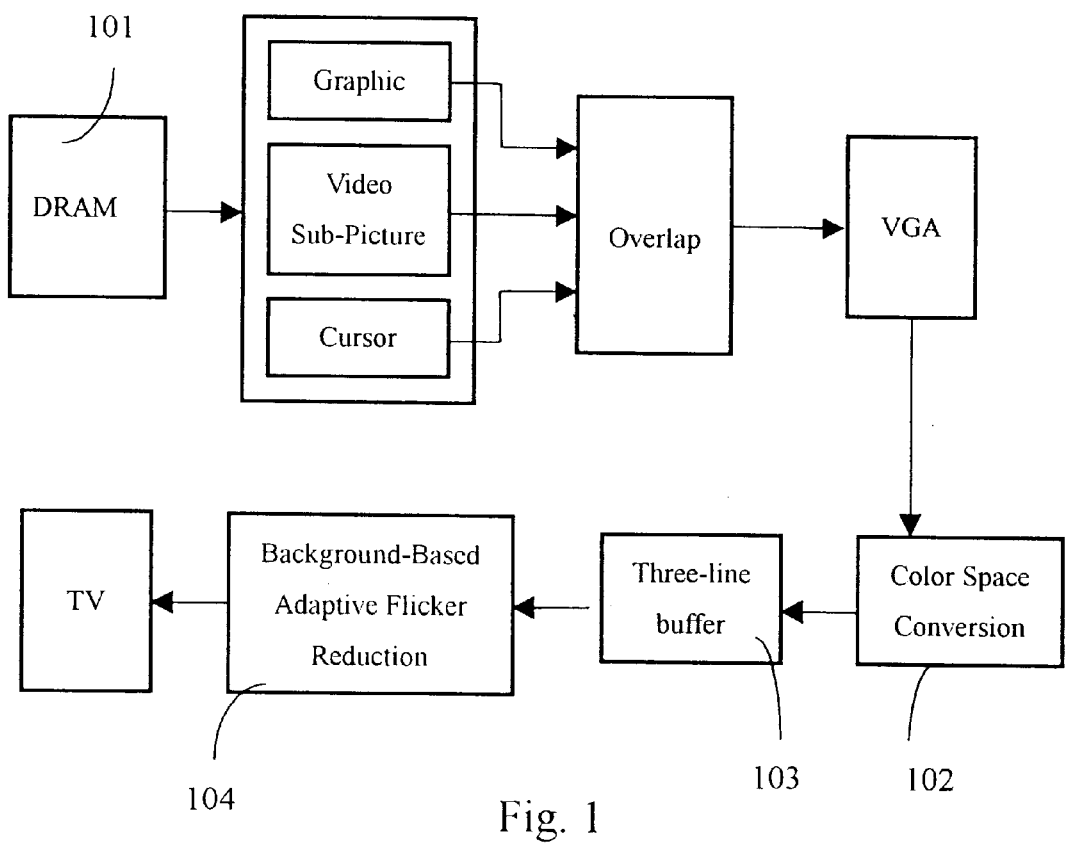
FIG. 1 is a block diagram of a preferred embodiment of the background-based adaptive flicker reduction system according to the present invention.

FIG. 1 shows the block diagram of a system that transforms video data from a VGA format to a TV format according to the present invention. The graphic and video information is read from the DRAM 101 and then overlaid as pictures of VGA data. The format of VGA data is a RGB format. Color space conversion 102 transforms a RGB format to a YUV(PAL) or YQI(NTSC) format.

The flicker reduction technique of this invention is accomplished by buffering the format-converted video and graphic data in a three-line buffer 103 and then performing the background-based adaptive flicker reduction 104. After the adaptive flicker reduction, high quality TV data with reduced flicker can be obtained.

Figure 2:
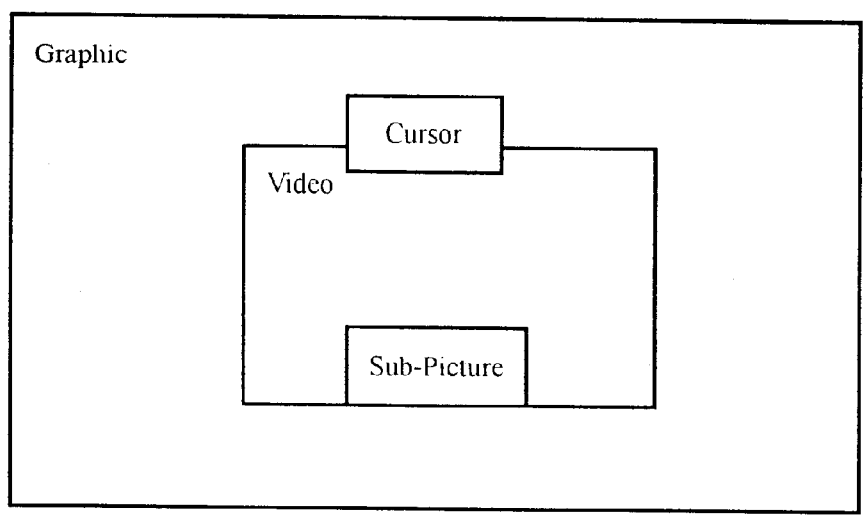
FIG. 2 illustrates different components of a picture displayed on a VGA monitor.

FIG. 2 shows the screen of a VGA monitor that comprises different types of information. The order of priority in showing data on the screen is cursor sub-picture, video and graphic information when they appear on the same position of the VGA monitor. For example, within the screen of the window, the graphic information and video information are not visible when cursor or sub-picture appears on the same position of the VGA monitor. Therefore, it is very important to determine whether the flicker reduction algorithm should be applied.

Figure 3:
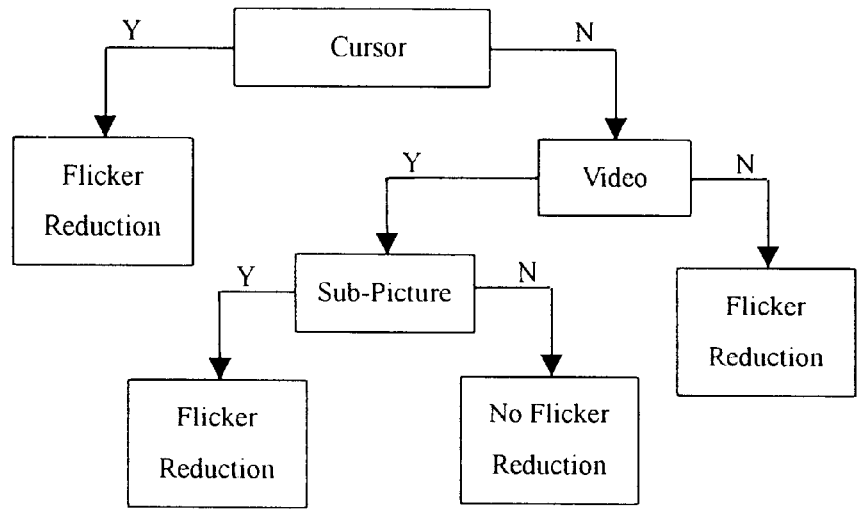
FIG. 3 illustrates a flow diagram of determining whether the adaptive flicker reduction method should be applied to a component in a picture according to the present invention.

FIG. 3 shows a flow diagram of determining whether the background-based flicker reduction should be applied. When video data are displayed on the VGA monitor, it is not necessary to perform flicker reduction. However, If graphic data are displayed on the VGA monitor, the background-based adaptive flicker reduction method is applied. Cursor and sub-picture are regarded as graphic information and must be processed using the flicker reduction method. Based on the flow diagram of FIG. 3, any picture as shown in FIG. 2 can be processed adaptively based on the background information when transforming the data from a VGA format to a TV format.

Figure 4:
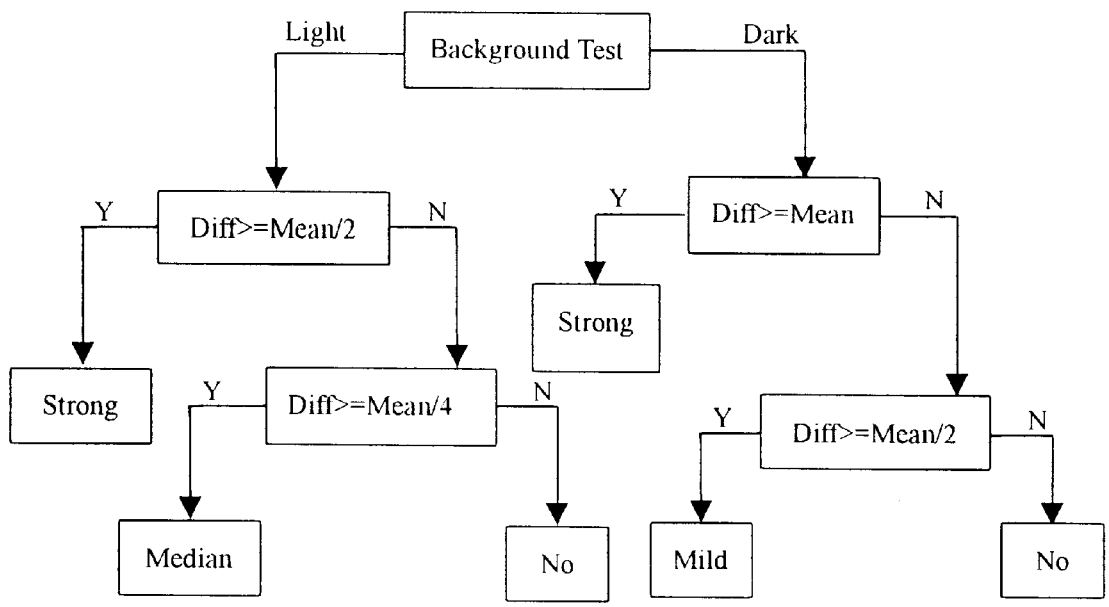
FIG. 4 illustrates a flow diagram of the background-based adaptive flicker reduction according to the present invention.

FIG. 4 shows the flow chart of the background-based adaptive flicker reduction algorithm according to this invention. The invention defines Mean and Diff values for each pixel under the anti-flicker processing. These two values are used to determine how the current pixel should be processed. In principle, when the background is bright and the contrast near a pixel is large, a stronger flicker reduction is required. If the background is bright but contrast is not as large, a median flicker reduction can be applied. If the background is bright but contrast is small, no flicker reduction is necessary. If the background is dark but contrast is large, a stronger flicker reduction also needs to be applied.

In the following description, Cpixel is defined as the current pixel which is to be processed by the flicker reduction algorithm, Upixel and Dpixel are defined as the pixels one line above and below the current pixel respectively. A Mean value around the pixel is defined as $$Mean=(2*Cpixel+Upixel+Dpixel).$$

In computing the Mean value, the multiplier can be implemented in hardware by shifting the pixel value one bit left. The Mean value is used to determine the information of the background according to a threshold value. The background is considered bright or dark dependent on whether the Mean value is larger or smaller than the threshold value.

The Diff value of a current pixel is defined as the summation of the absolute difference between the current pixel value and the pixel value above and below it as shown in the following equation:

$$Diff=abs(Cpixel-Upixel)+abs(Cpixel-Dpixel).$$

The Mean and Diff values defined above are used as parameters to evaluate the mode of flicker reduction that should be applied to the current pixel.

When the background is bright, the human eye is more sensitive to flicker phenomenon around large contrast pixel in the data transformed from VGA format to TV format. If the background is bright and the Diff value is greater or equal to Mean/2, the contrast around the current pixel is very large so the flicker phenomenon is very serious. The strong mode of flicker reduction is adopted and the anti-flicker output pixel is $$R=(8*Cpixel+4*Upixel+4*Dpixel)/16.$$

If the background is bright and the Diff value is between Mean/2 and Mean/4, a median mode of flicker reduction is applied because the flicker phenomenon is not as strong as the previously described condition. The anti-flicker output pixel is $$R=(10*Cpixel+3*Upixel+3*Dpixel)/16.$$

If the background is bright and the Diff value is smaller than Mean/4, the flicker phenomenon can be ignored. In order to improve the vertical resolution, it is not necessary to do any flicker reduction. The anti-flicker output pixel is $$R=Cpixel.$$

When the background is dark, the human eye is less sensitive to the flicker phenomenon in the data transformed from VGA to TV format. However, if larger than normal contrast exists in a picture, flicker becomes a serious problem. Therefore, in the present invention, if the background is dark and the Diff value is larger than Mean value, the strong mode of flicker reduction is adopted to reduce the flicker phenomenon. If the background is dark and the Diff value is between Mean and Mean/2, a mild mode of flicker reduction is applied because only mild flicker is sensed by the human eye. The anti-flicker output pixel is $$R=(12*Cpixel+2*Upixel+2*Dpixel)/16.$$

If the background is dark and the Diff value is smaller than Mean/2, no flicker reduction is required. From the above formulas for different modes of flicker reduction, it can be seen that the stronger the flicker reduction, the more the values from neighboring pixels are weighted in the value of the anti-flicker output pixel.

Figure 5:
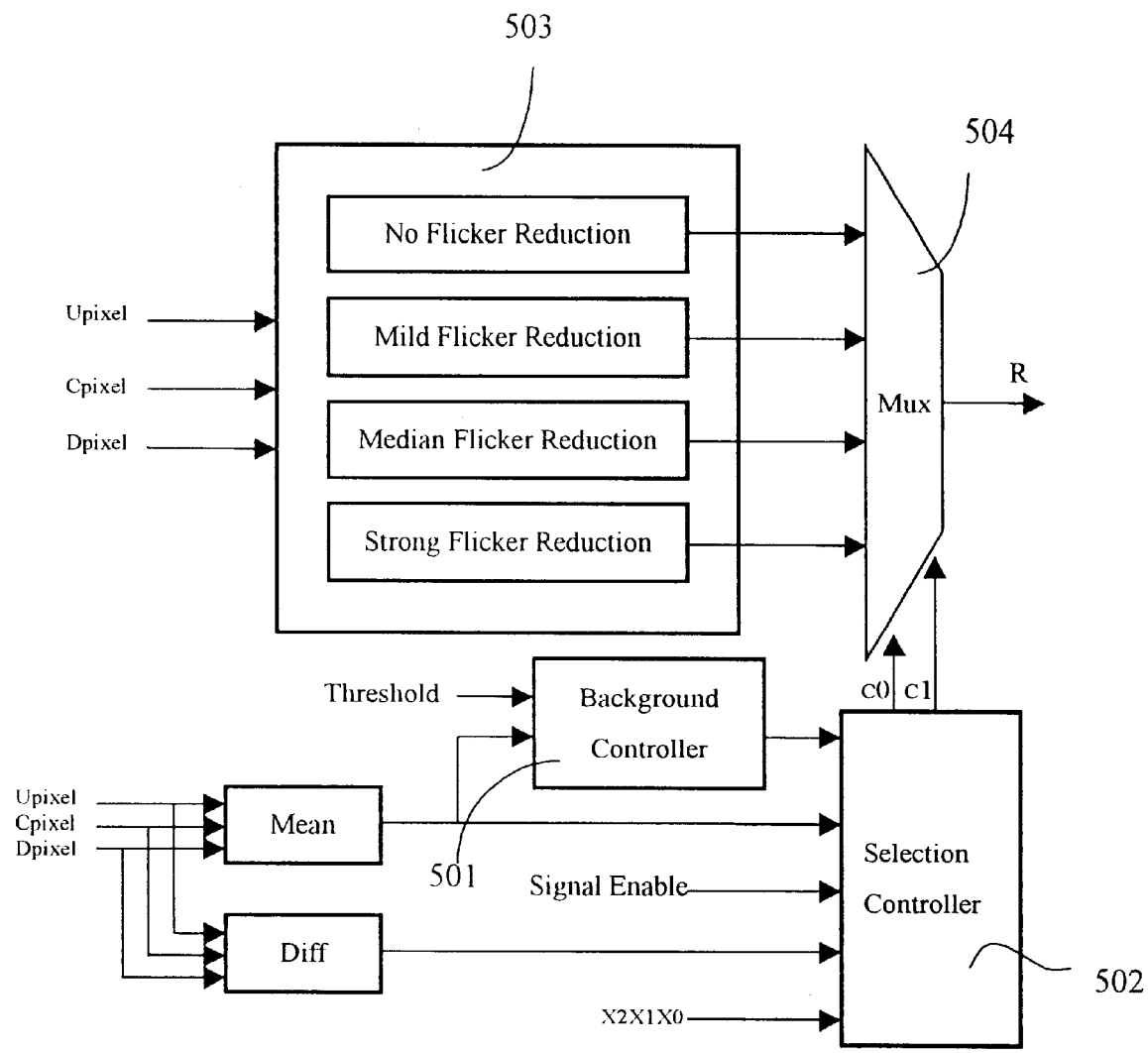
FIG. 5 is a block diagram of the hardware implementation of the background-based adaptive flicker reduction method according to the present invention.

The adaptive flicker reduction algorithm of the present invention can be implemented using hardware. To simplify the hardware, multiplication is done by shifting up the bits in the value of a pixel. FIG. 5 shows the block diagram of a preferred embodiment of the background-based adaptive flicker reduction system according to the present invention. The Mean and Diff blocks compute the Mean and Diff signals respectively around a current pixel according to the formulas discussed above.

The Background Controller 501 accepts the background state by comparing the Mean value with a Threshold value. Whether the flicker reduction is processed or not is determined by the signal Enable. When the screen is used for displaying graphic information, the signal Enable is set to high. On the other hand, the signal Enable is set to low when the screen is used for displaying only video information.

A three-bit control signal X2X1X0 is used to determine the degree of the anti-flicker method. When the most significant bit X2 is high, the two control bits X1 and X0 are ignored and the adaptive flicker reduction algorithm is adopted. If the X2 signal is set to low, non-adaptive flicker reduction is adopted. The two control bits X1X0 are used to control the degree of the flicker reduction. According to the two control bits X1X0, one of the four flicker reduction modes which are no, mild, median and strong is selected to process the pixels of the entire picture.

The relation between the control signal and mode selection is as follows

| X2 | X1 | X0 | Anti-Flicker Mode |
|---|---|---|---|
| 1 | x | x | adaptive |
| 0 | 0 | 0 | no |

-continued

| X2 | X1 | X0 | Anti-Flicker Mode |
|----|----|----|-------------------|
| 0  | 0  | 1  | mild              |
| 0  | 1  | 0  | median            |
| 0  | 1  | 1  | strong            |

The x symbol indicates that value can be ignored and has no impact on the result. Only when the signal Enable is set to high, the flicker reduction is applied. Otherwise, no flicker reduction is used to avoid degrading the quality of the picture. The Selection Controller 502 accepts Mean, Diff, Background Controller output, user-defined control signals X2X1X0 and the signal Enable to generate two new control signals C1C0. Four different anti-flicker output signals with different degrees of flicker reduction are generated in the flicker reduction processor 503. Finally, according to control signals C1C0, one of the anti-flicker signal is selected as the anti-flicker output pixel R by the four-to-one multiplexer Mux 504.

In summary, the present invention provides a method and apparatus for VGA to TV data transformation by using background-based adaptive flicker reduction. The present invention is capable of providing good quality of a picture as compared to other conventional methods. In addition, the present invention can be implemented by simple hardware circuit and is very suitable for consumer products.

What is claimed is:

1. A method for VGA to TV data transformation using a background-based adaptive flicker reduction algorithm, comprising the steps of:

pre-defining a flicker region rule for identifying if a region should be processed for flicker reduction;

determining if a region in a picture to be displayed on a screen is a flicker region or not according to said flicker region rule; and processing said region using a background-based adaptive flicker reduction algorithm if said region is a flicker region;

wherein said background-based adaptive flicker reduction algorithm comprises:
   (a) computing a Mean value according to pixel values of a current pixel, and adjacent pixels directly above and below said current pixel;
   (b) determining a background state based on said Mean value;
   (c) computing a Diff value according to absolute differences between pixel values of said adjacent pixels and said current pixel;
   (d) selecting a flicker reduction mode based on said background state, said Mean value and said Diff value; and
   (e) computing an anti-flicker pixel value for said current pixel according to said flicker reduction mode.

2. The method as claimed in claim 1, wherein a picture displayed on a screen comprises graphic and video information and said flicker region rule defines a region containing graphic information as a flicker region and a region containing video information as a non-flicker region.

3. The method as claimed in claim 2, wherein said graphic information includes cursor, graphic data and sub-picture of video data.

4. The method as claimed in claim 1, said Mean value being computed by adding twice the pixel value of said current pixel, the pixel value of an adjacent pixel directly above said current pixel, and the pixel value of an adjacent pixel directly below said current pixel.

5. The method as claimed in claim 1, said Diff value being computed by adding a first absolute difference between the pixel value of said current pixel and the pixel value of an adjacent pixel directly above said current pixel, and a second absolute difference between the pixel value of said current pixel and the pixel value of an adjacent pixel directly below said current pixel.

6. The method as claimed in claim 1, said background state being defined as a bright state if said Mean value is greater than a Threshold value, or a dark state if otherwise.

7. The method as claimed in claim 1, wherein the pixel values of a current pixel, an adjacent pixel directly above said current pixel, and an adjacent pixel directly below said current pixel are represented by Cpixel, Upixel and Dpixel respectively; and said flicker reduction mode includes a first flicker reduction mode having an anti-flicker output pixel value computed as (8Cpixel+4Upixel+4Dpixel)/16, a second flicker reduction mode having an anti-flicker output pixel value computed as (10Cpixel+3Upixel+3Dpixel)/16, a third flicker reduction mode having an anti-flicker output pixel value computed as (12Cpixel+2Upixel+2Dpixel)/16, and a fourth flicker reduction mode having an anti-flicker output pixel equal to Cpixel.

8. The method as claimed in claim 7, wherein the step of selecting said flicker reduction mode comprises the steps of:
   A. selecting a bright state if said Mean value is greater than a Threshold value, or a dark state if otherwise;
   B. going to step E if a dark state is selected, otherwise continuing step C;
   C. continuing step D if said Diff value is smaller than one half of said Mean value, otherwise going to step G;
   D. going to step J if said Diff value is smaller than a quarter of said Mean value, otherwise going to step H;
   E. going to step F if said Diff value is smaller than said Mean value, otherwise going to step G;
   F. going to step J if said Diff value is smaller than one half of said Mean value, otherwise going to step I;
   G. selecting a first flicker reduction mode and ending the selection;
   H. selecting a second flicker reduction mode and ending the selection;
   I. selecting a third flicker reduction mode and ending the selection;
   J. selecting a fourth flicker reduction mode and ending the selection.

9. An apparatus for VGA to TV data transformation using a background-based adaptive flicker reduction algorithm, comprising:

a flicker reduction processor for accepting pixel values of a current pixel, and adjacent pixels directly above and below said current pixel for generating anti-flicker output pixel values based on four different modes of flicker reduction; and a mode selection controller generating a mode selection signal to said flicker reduction processor for selecting an anti-flicker output pixel value;

wherein a Mean operator and a Diff operator accept pixel values of said current pixel, and adjacent pixels directly above and below said current pixel for computing and sending a Mean value and a Diff value respectively to said mode selection controller.

10. The apparatus for VGA to TV data transformation as claimed in claim 9, further comprising a background controller for comparing said Mean value with a threshold value and sending a background state signal to said mode selection controller.

11. The apparatus for VGA to TV data transformation as claimed in claim 9, said Mean value being computed by adding twice the pixel value of said current pixel, the pixel value of an adjacent pixel directly above said current pixel, and the pixel value of an adjacent pixel directly below said current pixel.

12. The apparatus for VGA to TV data transformation as claimed in claim 9, said Diff value being computed by adding a first absolute difference between the pixel value of said current pixel and the pixel value of an adjacent pixel directly above said current pixel, and a second absolute difference between the pixel value of said current pixel and the pixel value of an adjacent pixel directly below said current pixel.

* * * * *